United States Patent [19]

Shimizu et al.

[11] Patent Number: 5,201,945
[45] Date of Patent: Apr. 13, 1993

[54] POLYMER SCALE PREVENTIVE AGENT, POLYMERIZATION VESSEL FOR PREVENTING POLYMER SCALE DEPOSITION, AND PROCESS OF PRODUCING POLYMER USING SAID VESSEL

[75] Inventors: Toshihide Shimizu, Urayasu; Minoru Shigemitsu, Kamisu, both of Japan

[73] Assignee: Shin-Etsu Chemical Co., Ltd., Tokyo, Japan

[21] Appl. No.: 853,516

[22] Filed: Mar. 18, 1992

[30] Foreign Application Priority Data

Mar. 19, 1991 [JP] Japan .................................. 3-080789
Jul. 26, 1991 [JP] Japan .................................. 3-210310

[51] Int. Cl.$^5$ ................................................ C08L 1/00
[52] U.S. Cl. ........................................ 106/203; 526/62
[58] Field of Search ........................... 526/62; 106/203

[56] References Cited

U.S. PATENT DOCUMENTS 4,808,313  2/1989  Michizuki et al. ............. 210/500.28

Primary Examiner—Joseph L. Schofer
Assistant Examiner—David Wu
Attorney, Agent, or Firm—Oblon, Spivak, McClelland, Maier & Neustadt

[57] ABSTRACT

A polymer scale preventive agent for use in polymerization of a monomer having an ethylenically unsaturated double bond, comprising (A) a water-soluble basic polysaccharide and (B) an organic acid compound. The agent is used for forming a coating on the inner wall, etc. of a polymerization vessel. Deposition of polymer scale can be effectively prevented, and polymeric product with high whiteness is obtained.

7 Claims, No Drawings

POLYMER SCALE PREVENTIVE AGENT, POLYMERIZATION VESSEL FOR PREVENTING POLYMER SCALE DEPOSITION, AND PROCESS OF PRODUCING POLYMER USING SAID VESSEL

BACKGROUND OF THE INVENTION

1. Field of the Invention

The present invention relates to a polymer scale preventive agent in polymerization of a monomer having an ethylenically unsaturated double bond, a polymerization vessel for preventing polymer scale deposition, and a process of producing polymer using said vessel.

2. Description of the Prior Art

In processes of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and cooling capacity of the polymerization vessel are lowered; that the polymer scale may peel and mix into manufactured polymer, thereby impairing the quality of the manufactured polymer; and that removal of such polymer scale is laborious and hence time-consuming. Further, since the polymer scale contains unreacted monomer and operators may be exposed thereto, which may cause physical disorders in the operators.

Heretofore, as methods for preventing polymer scale deposition on the inner wall surface and so forth of a polymerization vessel in polymerization of a monomer having an ethylenically unsaturated double bond, methods in which substances exemplified below are coated on the inner wall surface, etc. as a scale preventive agent, have been known.

For example, particular polar organic compounds (Japanese Patent Publication (KOKOKU) No.45-30343(1970)), a dye or pigment (Japanese Patent Publication (KOKOKU) Nos.45-30835(1970) and 52-24953(1977)), an aromatic amine compound (Japanese Pre-examination Patent Publication (KOKAI) No.51-50887(1976)) and a reaction product of a phenolic compound and an aromatic aldehyde (Japanese Pre-examination Patent Publication (KOKAI) No.55-54317(1980)) are disclosed.

In the meantime, vinyl chloride polymers obtained by polymerization are required to have a good whiteness; for example, they are required to have an L value according to the Hunter's color difference equation, which is described in JIS Z 8730 (1980), of 70 or more.

The prior art polymer scale preventive agents generally include a great number of colored substances as exemplified typically by the dyes and pigments described in Japanese Patent Publication (KOKOKU) Nos.45-30835(1970) and 52-24953(1977), the aromatic amine compounds described in Japanese Pre-examination Patent Publication (KOKAI) No.51-50887(1976), and the reaction products of a phenolic compound and an aromatic aldehyde described in Japanese Preexamination Patent Publication (KOKAI) No.55-54317(1980). Presumably, for this, a colored polymer is obtained in suspension polymerization and the like of vinyl chloride, etc. in a polymerization vessel which has a coating comprising the polymer scale preventive agent described above formed on its inner wall. That is, according to measurement of the lightness L described above, the L may be measured to be 65 or less, and coloration is thereby confirmed. Presumably, the coloration is caused by incorporation of components of the coating which has dissolved or peeled into the polymerization mass. Improvement is required for producing a polymer of high quality.

Moreover, the prior art polymer scale preventive agents generally include poisonous substances as exemplified typically by terrible substances such as aniline, nitrobenzene, formaldehyde, etc. among the polar compounds described in the above-mentioned Japanese Patent Publication (KOKOKU) No.45-30343(1970), and pigments containing a heavy metal such as chromium or lead among the pigments described in Japanese Patent Publication (KOKOKU) No.45-30835(1970). The dyes described in Japanese Patent Publication (KOKOKU) Nos.45-30835(1970) and 52-24953(1977) include some dyes that involve concern about carcinogenesis. Therefore, use of these substances may cause problems in safety of operators.

Furthermore, the scale preventing effects by the conventional polymer scale preventive agents are liable to influence of polymerization conditions. For example, the scale preventing effects are lowered where a polymerization initiator with a high oxidative effect is used.

SUMMARY OF THE INVENTION

An object of the present invention is to provide a polymer scale preventive agent which is capable of preventing polymer scale deposition effectively, puts no color to product polymers to thereby produce the polymers with high whiteness, and are not poisonous and therefore causes no concern with respect to safety or sanitation, a polymerization vessel capable of preventing polymer scale deposition using the same preventive agent, and a process of producing a polymer using the polymerization vessel.

Thus, the present invention provides, as a means of attaining said object, a polymer scale preventive agent for use in polymerization of a monomer having an ethylenically unsaturated double bond, comprising:

(A) a water-soluble basic polysaccharide and (B) an organic carboxylic acid compound.

Further the present invention provides a polymerization vessel having on its inner wall surfaces a coating preventing deposition of polymer scale, wherein said coating comprises said components (A) and (B).

Furthermore, the present invention provides a process of producing a polymer by polymerization of a monomer having an ethylenically unsaturated double bond in a polymerization vessel, comprising the step of carrying out said polymerization in said polymerization vessel having on its inner surfaces the coating comprising the components (A) and (B), whereby the deposition of polymer scale is prevented.

According to the present invention, high whiteness polymers with an L value of 70 or more can be prepared. Moreover, the scale preventive agent used in the present invention has no poisonousness and is highly safe; hence there is no problem about safety or sanitation of operators.

Further, according to the present invention, polymer scale deposition can be effectively prevented, irrespectively of polymerization conditions such as the kind of a monomer or a polymerization initiator, polymerization type, the kind of material constituting the inner wall of polymerization vessels, etc. That is, deposition of polymer scale can be effectively prevented in polymerizations in which polymer scale deposition has been difficult to prevent, e.g., in emulsion polymerization, polymerizations using a polymerization vessel made of stainless steel, or polymerizations using a polymerization initiator with a strong oxidative effect such as potassium peroxodisulfate and the like.

Therefore, if polymerization is carried out under application of the present invention, the operation of removing polymer scale is not necessarily conducted every polymerization run, thereby productivity being improved.

DETAILED DESCRIPTION OF PREFERRED EMBODIMENTS

POLYMER SCALE PREVENTIVE AGENT

(A) Water-soluble basic polysaccharide

The water-soluble basic polysaccharide used in the present invention includes, for example, chitosans, water-soluble chitosan derivatives, polygalactosamines, water-soluble polygalactosamine derivatives and water-soluble chitin derivatives.

Chitosans are a straight chain polysaccharide (poly-1,4-α-glucosamine) formed by polymerization through β-1,4 linkage of D-glucosamine. It can be obtained by deacetylization of chitin contained in the carapace of the Crustacea such as prawns, shrimps and crabs. Recently a chitosan can be produced by culturing a mold, and the chitosan thus produced can be used in the same manner as those naturally occurring. The chitosans are insoluble in water under the neutral conditions, but soluble under the acidic conditions; hence the chitosans are used under a pH of less than 7.

The water-soluble chitosan derivatives which may be used in the present invention include the following:

(1) Organic acid salts and inorganic acid salts of chitosans. The organic acid specifically includes, for example, acetic acid, glycollic acid, malic acid, citric acid, and ascorbic acid. The inorganic acid includes, for example, hydrochloric acid, sulfuric acid, nitric acid and phosphoric acid. Chitosans preferably have a deacetylization degree of 40 to 100%.

(2) Water-soluble low molecular products obtained by decomposition of chitosans, i.e., water-soluble glucosamine oligomers. Normally, 5 to 20-mers of glucosamine are preferred. Such oligomers can be produced by conventional depolymerization methods, for example, the hydrochloric acid hydrolysis method (Japanese pre-examination patent publication(KOKAI) No. 61-21102(1986), the nitrate decomposition method (Japanese pre-examination patent publication (KOKAI) No. 62-184002(1987), the chlorine decomposition method (Japanese pre-examination patent publication (KOKAI) No. 60-186504(1985), the phosphoric acid decomposition method and decomposition methods using an enzyme or microorganism.

(3) Water-soluble derivatives of chitosans prepared by introducing a hydrophilic group thereinto. Examples are described in Japanese pre-examination patent publication (KOKAI) No. 63-14714(1988) and include polyoxyethylene chitosans, polyoxypropylene chitosans, phosphated chitosans, N-glycidyltrimethylammonium chitosans, and dihydropropylchitosans.

The polygalactosamines which may be used in the present invention are insoluble in water under the neutral conditions, but soluble under a pH of 7 or less and therefore used under such conditions. Polygalactosamines can be produced by culturing a mold (APPLICATION OF CHITIN AND CHITOSAN pp.24-26, Edited by Society for Research of Chitin and Chitosan, 1990, published by Giho-do Shuppan).

The water-soluble polygalactosamines include the following:

(1) Organic acid salts and inorganic acid salts of polygalactosamines including salts of organic acids such as acetic acid, formic acid or the like, and salts of inorganic acids such as hydrochloric acid, nitric acid or the like;

(2) Water-soluble low molecular products obtained by decomposition of polygalactosamines. Normally, 5 to 20-mers of galactosamine are preferred. Such oligomers can be produced by decomposition methods using an enzyme or microorganism.

The water-soluble chitin derivatives which may be used in the present invention, include the following: (1) Water-soluble N-acetylglucosamine oligomers obtained by decomposition of chitins. Normally, 5 to 20-mers are preferred. Such oligomers can be produced by conventional depolymerization methods, for example, the nitrous acid decomposition method, the formic acid decomposition method, the chlorine decomposition method (Japanese pre-examination patent publication (KOKAI) No. 62-186504(1987)) or decomposition methods using an enzyme (e.g., chittinase) or a microorganism.

(2) Water soluble derivatives of chitins prepared by introducing a hydrophilic group thereinto. Examples are described in Japanese pre-examination patent publication (KOKAI) No. 63-14714(1988) and include polyoxyethylene chitins, polyoxypropylene chitins, phosphated chitins and dihydropropylchitins.

Among the water-soluble basic polysaccharides described above, preferred are the inorganic acid salts and organic acid salts of chitosans, and more preferred are those having a deacetylization degree of 65% or more and a viscosity at 20° C. in the form of an aqueous solution containing 0.5% by weight of the chitosan and 0.5% by weight of acetic acid of 30 cP or more when measured with a B-type viscometer.

(B) Organic carboxylic acid compound

The component (B), organic carboxylic acid compound, of the scale preventive agent includes carboxylic acid anhydrides, hydroxycarboxylic acids, acyl halides and thiocarboxylic acids. Such compounds may be exemplified below.

Acid anhydrides

For example, aliphatic carboxylic acid anhydrides such as acetic anhydride, propionic anhydride, butyric anhydride, valeric anhydride, acrylic anhydride, methacrylic anhydride and crotonic anhydride; aromatic carboxylic acid anhydrides such as benzoic anhydride, toluic anhydride, salicylic anhydride, cinnamic anhydride, naphthoic anhydride, anthracene carboxylic acid anhydride; heterocyclic carboxylic acid anhydrides such as furoic anhydride and nicotinic anhydride; and polycarboxylic acid anhydrides such as diglycolic anhydride, malonic anhydride, succinic anhydride, glutaric anhydride, adipic anhydride, maleic anhydride, phthalic anhydride, pyromellitic anhydride, pulvinic anhydride, nitrophthalic anhydride and mellitic anhydride.

Halocarboxylic acids

For Example, monochloroacetic acid, dichloroacetic acid, trichloroacetic acid and β-chloropropionic acid.

Hydroxycarboxylic acids

For example, aliphatic hydroxycarboxylic acids such as glycolic acid, lactic acid, α-hydroxy-n-butyric acid, α-hydroxyisobutyric acid, α-hydroxy-n-valeric acid, α-hydroxy-n-caproic acid, hydroxyacrylic acid, β-hydroxybutylic acid, β-hydroxy-n-valeric acid, α-hydroxyacrylic acid, vinylglycolic acid, propenylglycolic acid, tartoronic acid, methyltartoronic acid, n-propyltartoronic acid, malic acid, α-hydroxy-α',-methylsuccinic acid, α-hydroxy-α,α'-dimethylsuccinic acid, α-hydroxyglutaric acid, β-hydroxyglutaric acid, α-hydroxyadipic acid, β-methoxyadipic acid, coumalic acid, glyceric acid, α,β-dihydroxy-α-isopropylbutyric acid, tartaric acid, d,l-tartaric acid, d-tartalic acid, 1-tartaric acid, chloromalic acid, hydroxycitraconic acid, α,β-dioxyglutaric acid, monocrotalic acid, d,g-dihydroxyadipic acid, 7,8-dihydroxyhexadecandioic acid, desoxalic acid, hydroxycitric acid, trihydroxybutylic acid, 3,4,5-trioxyhexanoic acid and trihydroxyglutaric acid; aromatic hydroxycarboxylic acids such as o-hydroxybenzoic acid, m-hydroxybenzoic acid, p-hydroxybenzoic acid, 2,3-dihydroxybenzoic acid, 3,4-dihydroxybenzoic acid, 3,5-dihydroxybenzoic acid, 2,4-dihydroxybenzoic acid, 2,6-dihydroxybenzoic acid, 2,5-dihydroxybenzoic acid, 3,4,5-trihydroxybenzoic acid, 2,3,5-trihydroxybenzoic acid, 3-methylsalicylic acid, 4-aminosalicylic acid, 4-sulfosalicylic acid, 3-chlorosalicylic acid, 5-nitro-β-resorcylic acid, 3-hydroxy-2-naphthoic acid, 3-hydroxy-5-sulfo-2-naphthoic acid, and 3-hydroxy-4-nitro-2-naphthoic acid; and heterocyclic hydroxycarboxylic acids such as kynurenic acid and xanthurenic acid.

Thiocarboxylic acids

For example, aliphatic thiocarboxylic acids such as thioglycolic acid, thiohydroacrylic acid, thiolactic acid and thiomalic acid; and aromatic thiocarboxylic acids such as thiosalicylic acid, o-thiocoumaric acid, thioacetic acid, thiopropionic acid, dithioformic acid, dithioacetic acid and ethanecarbodithioic acid.

The compounds above can be used singly or in combination of two or more.

Among the above compounds, preferred as the component (B) are pyromellitic anhydride, 4-aminosalicylic acid, 4-sulfosalicylic acid, thiosalicylic acid, 2,3,5-trihydroxybenzoic acid and mellitic anhydride.

The amount of the component (B) in the polymer scale preventive agent of the present invention ranges normally from 0.1 to 1,000 parts by weight, preferably 1 to 600 parts by weight, per 100 parts by weight of the amount of the component (A). If the amount of the component (B) is too small or too large, improvement in scale preventing effect due to the combined use of the components (A) and (B) is lowered.

The polymer scale preventive agent is used for forming a coating on the inner wall surfaces, and preferably the surfaces of parts with which monomer comes into contact during polymerization, e.g., a stirring shaft, stirring blades, baffles, condensing coils, etc. of a polymerization vessel, so that scale deposition in the vessel can be prevented. Normally, in forming said coating on the inner wall surfaces, etc. of a polymerization, the polymer scale preventive agent is used in a liquid state, i.e., as a coating liquid.

To the scale preventive agent, for example, a cationic surfactant, a nonionic surfactant, an anionic surfactant, and the like can be added as long as the scale preventing effect is not impaired.

Further, inorganic compounds can be added to the agent as long as the high whiteness, non-poisonnousness or the scale preventing effect is not impaired. The inorganic compounds which may be added include, for example, silicic acids or silicates such as orthosilicic acid, metasilicic acid, mesodisilicic acid, mesotrisilicic acid, mesotetrasilicic acid, sodium metasilicate, sodium orthosilicate, sodium disilicate, sodium tetrasilicate and water glass; metallic salts such as oxygen acid salts, acetates, nitrates, hydroxides or halides of a metal selected from alkali earth metals such as magnesium, calcium, strontium and barium, zinc family metals such as zinc, aluminum family metals such as aluminum, and platinum family metals such as ruthenium, rhodium, palladium, osmium, iridium and platinum; and inorganic colloids such as ferric hydroxide colloid, colloidal silica, colloid of barium sulfate, and colloid of aluminum hydroxide. The abovementioned inorganic colloids may be those prepared, for example, by mechanical crushing, irradiation with ultrasonic wave, electrical dispersion or chemical methods.

The polymer scale preventive agent is used for forming a coating on the inner wall surfaces, and preferably the surfaces of parts with which monomer comes into contact during polymerization, e.g., a stirring shaft, stirring blades, baffles, condensing coils, etc. of a polymerization vessel, so that scale deposition in the vessel can be prevented. Normally, in forming said coating on the inner wall surfaces, etc. of a polymerization, the polymer scale preventive agent is used in a liquid state, i.e., as a coating liquid.

Preparation of a coating liquid

The coating liquid mentioned above is prepared by dissolving or dispersing said components (A) and (B) in a suitable solvent.

The solvents used for preparation of the coating solution include, for example, water; alcohols such as methanol, ethanol, propanol, butanol, 2-butanol, 2-methyl-1-propanol, 2-methyl-2-propanol, 3-methyl-1-butanol, 2-methyl-2-butanol, 2-pentanol, etc.; ketones such as acetone, methyl ethyl ketone, methyl isobutyl ketone, etc.; esters such as methyl formate, ethyl formate, methyl acetate, methyl acetoacetate, etc.; ethers such as 4-methyldioxolane, ethylene glycol diethyl ether, etc.; furans; and aprotic solvents such as dimethylformamide, dimethyl sulfoxide, acetonitrile, etc. These solvents may be used singly or as a mixed solvent of two or more thereof as appropriate.

The total concentration of the components (A) and (B) is not limited as long as the coating weight described later can be obtained, and it is normally in the range from 0.005 to 10% by weight, preferably from 0.01 to 5% by weight.

There is no particular limitation on the pH of the coating liquid. A pH adjuster such as an acid or alkali may be added as appropriate.

Formation of coating

When the coating liquid prepared as described above is used for forming a coating on the inner wall surface of a polymerization vessel, first, the coating liquid is applied to the inner wall surface and then dried sufficiently, followed by washing with water if necessary. A coating is formed by these operations on the inner wall surface of the polymerization vessel; hence the polymer scale deposition thereon can be prevented.

The above-mentioned coating is preferably formed on not only the inner wall surfaces of a polymerization vessel but also other parts with which the monomer comes into contact during polymerization. For example, it is preferred to form the coating by applying said coating liquid on a stirring shaft, stirring blades, condensers, headers, search coil, bolts, nuts, etc.

More preferably, the coating is formed on not only the parts with which the monomer comes into contact during polymerization but also other parts on which polymer scale may deposit, for example, such as the inner surfaces of equipment and tubes of recovery system for unreacted monomer. These parts, more specifically, are exemplified by the inner wall surfaces of monomer distillation columns, condensers, monomer stock tanks and valves, etc. in said recovery system.

The method of applying the coating liquid on the inner wall surface, etc. of a polymerization vessel is not particularly limited, and includes, for example, the brush coating, spray coating, the method of filing the polymerization vessel, etc. with the coating liquid followed by withdrawal thereof, and automatic coating methods as disclosed in Japanese Pre-examination Patent Publication (KOKAI) Nos.57-61001(1982) and 55-36288(1980), and Japanese Patent Publication (KOHYO) Nos.56-501116(1981) and 56-501117(1981), and Japanese Pre-examination Publication (KOKAI) No.59-11303(1984), etc.

The method of drying wet coated surface provided by application of the coating liquid, is not limited, either. The drying is conducted preferably at a temperature within the range from room temperature to 100° C. Specifically, a method in which, after the liquid is applied, hot air with a suitable elevated temperature is blown to the coated surface, and a method in which the inner wall surface of a polymerization vessel and the surfaces of other parts to be coated are previously heated at, e.g., 30°-80° C. and the coating liquid is directly applied to the heated surfaces, etc. After dried, the coated surfaces are washed with water if necessary.

The coating thus formed has normally a coating weight of 0.001 g/m$^2$ or more, preferably from 0.05 to 2 g/m$^2$.

The above coating operation may be conducted every 1 to ten-odd batches of polymerization. The formed coating has fairly good durability and retains the polymer scalepreventing action; therefore the coating operation is not necessarily performed for every batch of polymerization. Hence, the productivity of the manufactured polymer is improved.

Addition to polymerization system

The polymer scale preventive agent of the present invention may be added into a polymerization medium in addition to the formation of the coating, so that the scale preventing effect is further improved. The scale preventive agent is normally added in a liquid state like the coating liquid described above. The amount of the polymer scale preventive agent to be added into the polymerization medium, preferably ranges from about 5 ppm to 1,000 ppm based on the whole weight of the monomer charged. The addition should be conducted so that it may not adversely affect the quality of polymeric product to be obtained with respect to fish eyes, bulk density, particle size distribution, etc.

Polymerization

After forming the coating on the inner wall surfaces of a polymerization vessel and other parts with which monomer may come into contact by application of the coating liquid, polymerization is carried out in accordance with conventional procedures therein. That is, a monomer having an ethylenically unsaturated double bond and a polymerization initiator (catalyst) are charged, and then, a polymerization medium such as water, etc. and, optionally, a dispersing agent such as suspending agents, solid dispersing agents, and nonionic and anionic emulsifying agents, etc. are charged, followed by carrying out polymerization according to conventional methods.

The monomer having an ethylenically unsaturated double bond to which the method of this invention can be applied includes, for example, vinyl halides such as vinyl chloride; vinyl esters such as vinyl acetate and vinyl propionate; acrylic acid, methacrylic acid, and esters and salts thereof; maleic acid, fumaric acid, and esters and anhydrides thereof; and diene monomers such as butadiene, chloroprene and isoprene; aromatic vinyl compounds such as styrene; as well as acrylonitrile, halogenated vinylidenes, and vinyl ethers.

There are no particular limitations on the type of polymerization to which the method of this invention can be applied. The present invention is effective in any types of polymerization such as suspension polymerization, emulsion polymerization, solution polymerization, bulk polymerization, and gas phase polymerization. Particularly, the present invention is suitable to polymerizations in an aqueous medium such as suspension or emulsion polymerization.

Specifically, in the case of suspension polymerization and emulsion polymerization, polymerization is generally performed as follows, for instance.

First, water and a dispersing agent are charged into a polymerization vessel, and thereafter a polymerization initiator is charged. Subsequently, the inside of the polymerization vessel is evacuated to a pressure of from about 0.1 to about 760 mmHg, and a monomer is then charged (whereupon the pressure inside the polymerization vessel usually becomes from 0.5 to 30 kgf/cm$^2$. G). Then, the polymerization is normally carried out at a temperature of from 30° to 150° C. During the polymerization, one or more of water, a dispersing agent and a polymerization initiator may be added, if necessary. Suitable reaction temperature during the polymerization is different depending on the kind of monomer to be polymerized. For example, in the case of polymerizing vinyl chloride, polymerization may be carried out at 30° to 80° C.; in the case of polymerizing styrene, polymerization may be carried out at 50° to 150° C. The polymerization may be judged to be completed when the pressure inside the polymerization vessel falls to from about 0 to 7 kgf/cm$^2$. G or when cooling water which passes through a jacket provided around the polymerization vessel indicates almost the same temperature at the inlet where it is charged and at the outlet where it is discharged (i.e., when liberation of heat due to polymerization reaction has been completed). The water, dispersing agent and polymerization initiator for the polymerization are charged in amounts of about 20 to 500 parts by weight, about 0.01 to 30 parts by weight, and about 0.01 to 5 parts by weight, respectively, per 100 parts by weight of the monomer.

In the case of solution polymerization, an organic solution such as toluene, xylene, pyridine and the like is used as a polymerization medium in place of water. The dispersing agent is optionally used. The other conditions are generally the same as those described for suspension and emulsion polymerization.

In the case of bulk polymerization, after the inside of a polymerization vessel is evacuated to a pressure of from about 0.01 mmHg to about 760 mmHg, a monomer and a polymerization initiator are charged, and then polymerization is carried out at a temperature of from −10° C. to 250° C. For example, in the case of polymerizing vinyl chloride, polymerization is carried out at a temperature of from 30° C. to 80° C.; and in the case of polymerizing styrene, polymerization may be carried out at 50° C. to 150° C.

The present invention is effective in preventing polymer scale from depositing, independent of materials constituting the inner wall, etc. of a polymerization vessel. For example, this method is effective in preventing polymer scale from depositing in polymerization vessels made of a stainless steel or other steels or vessels internally lined with glass.

Any additive materials that have been added in a polymerization system can be used without any limitation. More specifically, this invention can effectively prevent polymer scale from depositing, even in polymerization systems containing the following additives: for example, polymerization initiators such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylyaleronitrile, potassium peroxodisulfate, ammonium peroxodisulfate, p-methane hydroperoxide; suspension agents comprised of natural or synthetic polymeric compounds such as partially saponified polyvinyl alcohols, polyacrylic acids, vinyl acetate/maleic anhydride copolymers, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as trichloroethylene and mercaptans as exemplified by t-dodecyl mercaptans; and pH adjusters.

EXAMPLES

The present invention is now described in detail by way of working examples and comparative examples. In each of the tables below, Experiments of Nos. marked with * are comparative examples, and the other Experiments working examples of the present invention.

Chitosans used as the component (A) in Examples 1 and 2 below are those described in Table 1.

TABLE 1

| Used Chitosan[3] | Viscosity | Deacetylization degree[2] | Manufacturer |
|---|---|---|---|
| Chitosan (CLH) | 100 cP or more[1] | 80.0% or more | Yaizu Suisankagaku Kogyo K.K. |
| Chitosan (PSH) | 100 cP or less[1] | 80.0% or more | " |
| Chitosan (PSL) | 100 cP or less[1] | 80.0% or more | " |
| Chitosan (90M) | 100–300 cP[1] | 85.0–94.9% | Wako Junyaku Kogyo K.K. |
| Chitosan (100L) | 30–100 cP[1] | 99.0% or more | " |
| Chitosan (70H) | 300–500 cP[1] | 65.0–79.4% | " |
| Chitosan (80H) | 300–500 cP[1] | 75.0–84.9% | " |

Remarks:
[1] Viscosity: A 0.5 wt. % chitosan, 0.5 wt. % acetic acid aqueous solution was prepared, and its viscosity was measured at 20° C. with a B-type viscometer.
[2] Deacetylization degree: measured by the PVSK colloid solution titration method.
[3] Tradenames are indicated in parentheses.

EXAMPLE 1

Polymerization was carried out in the following manner using a polymerization vessel with an inner capacity of 1,000 liters and having a stirrer.

In each experiment, first, a component (A) and a component (B) were dissolved in a solvent so that the total concentration thereof might become the value given in Table 2, to prepare a coating liquid. Specifically, the water-soluble basic polysaccharide was dissolved completely in an aqueous glycolic acid solution with a pH of 4. The resulting solution was diluted with methanol and then mixed with the component (B). The coating liquid was applied by spraying to the inner wall and other parts with which a monomer comes into contact including the stirring shaft, stirring blades and baffles, followed by drying under heating at 40° C. for 15 min. to form a coating, which was then washed with water.

Experiments of Nos. 101–103 are comparative examples in which no coating liquid was applied or a coating liquid containing either component (A) or (B) was applied.

The water-soluble basic polysaccharide (A), the organic carboxylic acid compound (B), the total concentration of the components (A) and (B), the weight ratio of (A)/(B), and the solvent used in each experiment are given in Table 2.

Subsequently, in the polymerization vessel in which a coating had been formed as above, were charged 400 kg of water, 200 kg of vinyl chloride, 250 g of a partially saponified polyvinyl alcohol, 25 g of hydroxypropylmethyl cellulose and 75 g of bis(2-ethylhexyl) peroxydicarbonate. Then, polymerization was carried out at 57° C. with stirring for 6 hours. After the completion of the polymerization, the amount of polymer scale depositing on the inner wall of the polymerization vessel and the whiteness of the polymer obtained were measured according to the following.

Measurement of the amount of polymer scale deposition

The scale depositing on the inner wall surface in an area of 10 cm$^2$ were scraped off with a stainless steel spatula as completely as possible to be confirmed with naked eyes, and then the scraped scale was weighted on a balance. Thereafter, the amount of the deposited scale per area of 1 m$^2$ was obtained by multiplying the measured value by 100.

Measurement of whiteness of polymer

A hundred parts by weight of a polymer, one part by weight of a tin laurate stabilizing agent (trade name: TS-101, product of Akishima Chemical Co.) and 0.5 part by weight of a cadmium stabilizing agent (trade name: C-100J, product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm ×4 cm×1.5 cm (thickness), and molded under heating at 160° C. and under a pressure of 65° to 70 kgf/cm$^2$ to prepare a test specimen. This test specimen was measured for luminosity index L in the Hunter's color difference equation described in JIS Z 8730 (1980). Whiteness was evaluated to become higher with increase in L value.

The L value was determined as follows.

The stimulus value Y of XYZ color system was determined according to the photoelectric tristimulus colorimetry using the standard light C, a photoelectric colorimeter (Color measuring color difference meter Model Z-1001DP, product of Nippon Denshoku Kogyo K.K.) in accordance with JIS Z 8722. As the geometric condition for illumination and being illuminated, the condition d defined in section 4.3.1 of JIS Z 8722 was adopted. Next, L was calculated based on the equation: L=10$^{\frac{1}{2}}$described in JIS Z 8730(1980).

The results are given in Table 2.

TABLE 2

| | | Coating liquid | | | | | Amount of Polymer scale (g/m$^2$) | L value |
|---|---|---|---|---|---|---|---|---|
| Exp. No. | (A) Basic polysaccharide | (B) Organic carboxylic acid compound (B)-1 | (B)-2 | (A) + (B) Total concentration (wt. %) | Weight ratio A/B-1/B-2 | Solvent (wt. %) | | |
| 1 | — | — | — | — | — | — | 1300 | 73 |
| 2 | Chitosan (70H) | — | — | 0.1 | 100/0/0 | Water/Methanol (25/75) | 20 | 73 |
| 3 | Chitosan (70H) | 4-aminosalicylic acid | — | 0.1 | 100/40/0 | Water/Methanol (25/75) | 3 | 73 |
| 4 | Chitosan (70H) | 4-aminosalicylic acid | Pyromellitic anhydride | 0.1 | 100/20/20 | Water/Methanol (25/75) | 0 | 73 |
| 5 | Chitosan (70H) | 4-aminosalicylic acid | Tartaric acid | 0.1 | 100/30/15 | Water/Methanol (25/75) | 0 | 73 |
| 6 | Glycol chitosan | Nicotinic anhydride | — | 0.2 | 100/25/0 | Water/methanol (50/50) | 1 | 72.5 |
| 7 | Polyoxypropylene chitosan | Phthalic anhydride | — | 0.05 | 100/100/0 | Water/Methanol (10/90) | 5 | 73 |
| 8 | Chitosan (90M) | Salicylic anhydride | — | 0.1 | 100/900/0 | Water/Methanol (10/90) | 2 | 73 |
| 9 | Chitosan (70H) | Pyromellitic anhydride | — | 0.1 | 100/10/0 | Water/Methanol (5/95) | 2 | 72 |
| 10 | Chitosan (90M) | Maleic anhydride | 4-sulfosalicylic acid | 0.1 | 100/100/20 | Water/Methanol (10/90) | 0 | 73 |
| 11 | Chitosan (100L) | Acetic anhydride | — | 0.1 | 100/100/0 | Water/Methanol (5/95) | 2 | 73 |
| 12 | Chitosan (100L) | Monochloroacetic acid | — | 0.1 | 100/40/0 | Water/Methanol (10/90) | 2 | 73 |
| 13 | Chitosan (70H) | 4-sulfosalicylic acid | — | 0.2 | 100/5/0 | Water/Methanol (10/90) | 3 | 73 |
| 14 | Dihydroxypropyl chitosan | Tartaric acid | — | 0.1 | 100/40/0 | Water/Methanol (10/90) | 8 | 73 |
| 15 | Chitosan (100L) | Thiomalic acid | — | 0.1 | 100/100/0 | Water/Methanol (50/50) | 5 | 72.5 |
| 16 | Chitosan (100L) | Thiosalicylic acid | — | 0.05 | 100/400/0 | Water/Methanol (50/50) | 1 | 72.5 |

EXAMPLE 2

In each experiment, the coating procedure of Example 1 was repeated for a stainless steel polymerization vessel having an inner capacity of 20 liters and equipped with a stirrer, except that an aqueous acetic acid solution with a pH of 4 was used in place of the glycolic acid solution for preparation of a coating liquid, and that a coating liquid in which the water-soluble basic polysaccharide (A), the organic carboxylic acid compound (B), the total concentration of the components (A)+(B), the weight ratio of (A)/(B), and the solvent are as given in Table 3, was used, Experiments of Nos. 201 to 203 are comparative experiments in which no coating liquid was applied or a coating liquid containing either component (A) or (B) was applied.

In the polymerization vessel in which the coating was thus formed, were charged 9 kg of water, 225 g of sodium dodecylbenzenesulfonate, 12 g of t-dodecyl mercaptan, and 13 g of potassium peroxodisulfate. After the inner atmosphere was replaced with a nitrogen gas, 1.3 kg of styrene and 3.8 kg of butadiene were charged, followed by polymerization at 50° C. for 20 hours.

After completion of the polymerization, the amount of polymer scale depositing on the inner wall surface was measured in the same manner as in Example 1.

The results are given in Table 3.

TABLE 3

| | | Coating liquid | | | | | Amount of Polymer scale (g/m$^2$) |
|---|---|---|---|---|---|---|---|
| Exp. No. | (A) Basic polysaccharide | (B) Organic carboxylic acid compound (B)-2 | (B)-2 | (A) + (B) Total concentration (wt. %) | Weight ratio A1/B-1/B-2 | Solvent (wt. %) | |
| 17 | — | — | — | — | — | — | 400 |
| 18 | Chitosan (PSH) | — | — | 0.1 | 100/0/0 | Water/Methanol (25/75) | 18 |
| 19 | Chitosan (PSH) | Acetic anhydride | — | 0.1 | 100/20/0 | Water/Methanol (5/95) | 5 |
| 20 | Chitosan (PSH) | Acetic anhydride | 4-sulfosalicylic acid | 0.1 | 100/20/20 | Water/Methanol (5/95) | 0 |
| 21 | Chitosan (70H) | Benzoic anhydride | α, β-dioxyglutaric acid | 0.05 | 100/80/20 | Water/Methanol (10/90) | 1 |

TABLE 3-continued

| Exp. No. | (A) Basic polysaccharide | (B) Organic carboxylic acid compound (B)-2 | (B) Organic carboxylic acid compound (B)-2 | (A) + (B) Total concentration (wt. %) | Weight ratio A1/B-1/B-2 | Solvent (wt. %) | Amount of Polymer scale (g/m²) |
|---|---|---|---|---|---|---|---|
| 22 | Glycol chitosan | Nicotinic anhydride | d,l-tartaric acid | 0.05 | 100/20/20 | Water/Methanol (50/50) | 9 |
| 23 | Glycol chitosan | Maleic anhydride | 3-hydroxy-5-sulfo-2-naphthoic acid | 0.05 | 100/20/20 | Water/Methanol (5/95) | 10 |
| 24 | Glycol chitosan | 4-aminosalicylic acid | Trihydroxybutyric acid | 0.2 | 100/200/30 | Water/Methanol (5/90) | 8 |
| 25 | Chitosan (70H) | Thiosalicylic acid | Hydroxycitric acid | 0.2 | 100/90/10 | Water/Methanol (5/90) | 0 |
| 26 | Chitosan (70H) | 2,3,5-trihydoroxy-benzoic acid | Mellitic anhydride | 0.2 | 100/200/30 | Water/Methanol (5/90) | 0 |
| 27 | Chitosan (70H) | Dichloroacetic acid | Trihydroxyglutaric acid | 0.1 | 100/10/10 | Water/Methanol (10/90) | 1 |
| 28 | Chitosan (70H) | 3-hydroxy-4-nitro-2-naphthoic acid | Hydroxycitraconic acid | 0.1 | 100/20/20 | Water/Methanol (10/90) | 1 |

We claim:

1. A polymer scale preventive agent for use in polymerization of a monomer having an ethylenically unsaturated double bond, comprising:
    (A) a chitosan selected from the group consisting of organic acid salts of chitosans having a deacetylization degree of 40 to 100%, inorganic acid salts of chitosans having a deacetylication degree of 40 to 100%, water-soluble 5- to 20-mers of glucosamine, polyoxyethylene chitosans, polyoxypropylene chitosans, phosphated chitosans, N-glycidyltrimethylammonium chitosans and dihydropropyl chitosans; and
    (B) an organic carboxylic acid compound selected from the group consisting of carboxylic acid anhydride, hydroxycarboxylic acids, acyl halides and thiocarboxylic acids.

2. The composition of claim 1, wherein said chitosan is selected from the group consisting of inorganic acid salts of chitosans having a deacetylization degree of 40 to 100%, water-soluble 5- to 20-mers of glucosamine, polyoxyethylene chitosans, polyoxypropylene chitosans, phosphated chitosans, N-glycidyltrimethylammonium chitosans and dihydropropyl chitosans.

3. The composition of claim 1, wherein said organic carboxylic acid compound is selected from the group consisting of carboxylic acid anhydrides, acyl halides and thiocarboxylic acids.

4. The agent of claim 1, wherein the organic carboxylic acid compound is selected from the group consisting of pyromellitic anhydride, 4-aminosalicylic acid, 4-sulfosalicylic acid, thiosalicylic acid, 2,3,5-trihydroxybenzoic acid and metlitic anhydride.

5. The polymer scale prevent agent according to claim 1, wherein the amount of the component (B) is 0.1 to 1,000 parts by weight per 100 parts by weight of the component (A).

6. The polymer scale preventive agent according to claim 1, which further comprises a solvent in which the components (A) and (B) has been dissolved or dispersed to form a liquid state.

7. The polymer scale preventive agent according to claim 6, wherein the total concentration of the components (A) and (B) is in the range of from 0.005 to 10% by weight.

* * * * *